United States Patent
Rothschild

(10) Patent No.: US 8,798,544 B2
(45) Date of Patent: *Aug. 5, 2014

(54) WIRELESS COMMUNICATIONS USING COINCIDING MULTIPLE PAIRING CRITERIA

(71) Applicant: Ariel Inventions, LLC, Bay Harbor Islands, FL (US)

(72) Inventor: Leigh M. Rothschild, Sunny Isles Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/804,509

(22) Filed: Mar. 14, 2013

(65) Prior Publication Data

US 2013/0196602 A1    Aug. 1, 2013

Related U.S. Application Data

(63) Continuation of application No. 13/471,140, filed on May 14, 2012, now Pat. No. 8,437,797, which is a continuation of application No. 12/228,256, filed on Aug. 8, 2008, now Pat. No. 8,204,437.

(51) Int. Cl.
*H04B 7/00*    (2006.01)
*H04W 4/02*    (2009.01)

(52) U.S. Cl.
CPC ...................................... *H04W 4/02* (2013.01)
USPC .................... 455/41.2; 455/550.1; 455/456.1; 455/456.2; 455/41.1; 455/41.3

(58) Field of Classification Search
None
See application file for complete search history.

(56) References Cited

U.S. PATENT DOCUMENTS

| | | |
|---|---|---|
| 5,917,542 A | 6/1999 | Moghadam et al. |
| 6,230,187 B1 | 5/2001 | Suzuki |
| 6,253,023 B1 | 6/2001 | Fukushima et al. |
| 6,642,959 B1 | 11/2003 | Arai |
| 6,715,003 B1 | 3/2004 | Safai |
| 6,832,275 B1 | 12/2004 | Aizawa |
| 7,876,357 B2 | 1/2011 | Jung et al. |
| 8,204,437 B1 | 6/2012 | Rothschild |
| 2002/0051074 A1 | 5/2002 | Kawaoka et al. |
| 2002/0057350 A1 | 5/2002 | Takei et al. |
| 2002/0149677 A1 | 10/2002 | Wright |
| 2003/0191673 A1* | 10/2003 | Cohen ................................ 705/5 |
| 2004/0169730 A1 | 9/2004 | Tamura et al. |
| 2005/0191963 A1* | 9/2005 | Hymes ......................... 455/41.2 |
| 2006/0171603 A1 | 8/2006 | Jung et al. |
| 2006/0174204 A1 | 8/2006 | Jung et al. |
| 2006/0174206 A1 | 8/2006 | Jung et al. |
| 2007/0032240 A1* | 2/2007 | Finnegan et al. ............. 455/445 |
| 2009/0027505 A1 | 1/2009 | Jung et al. |
| 2009/0115852 A1 | 5/2009 | Jung et al. |
| 2010/0271490 A1* | 10/2010 | Jung et al. .................. 348/207.1 |
| 2012/0190386 A1* | 7/2012 | Anderson .................. 455/456.3 |
| 2012/0329475 A1* | 12/2012 | Ribaudo et al. ............ 455/456.1 |

\* cited by examiner

*Primary Examiner* — Fayyaz Alam
(74) *Attorney, Agent, or Firm* — Atanu Das; Techlaw LLP

(57) ABSTRACT

A system including a first mobile device and a second mobile device is disclosed. The first mobile device has a first interactive pairing criterion associated therewith, and the second mobile device has a second interactive pairing criterion associated therewith. The first mobile device includes a processor configured to perform and/or initiate the following. Upon the second mobile device being geographically positioned within a predetermined geographic distance from the first mobile device, an automatic query is issued to determine whether the first interactive pairing criterion and the second interactive pairing criterion at least partially coincide with one another. Upon a determination that the first interactive pairing criterion and the second interactive pairing criterion at least partially coincide with one another, a digital media file associated with the second mobile device is downloaded.

26 Claims, 6 Drawing Sheets

WIRELESS COMMUNICATIONS USING COINCIDING MULTIPLE PAIRING CRITERIA

CROSS-REFERENCE TO RELATED APPLICATIONS

This application also is a Continuation-in-Part of U.S. application Ser. No. 13/471,140, filed on May 14, 2012, which is a Continuation of U.S. application Ser. No. 12/228, 256, filed on Aug. 8, 2008, both of which are incorporated herein in their entirety. This application also is a Continuation-in-Part of U.S. application Ser. No. 13/804,817, entitled "Wireless Communications Using Multiple Pairing Criteria," filed on Mar. 14, 2013, and incorporated herein by reference in its entirety.

BACKGROUND

1. Field

The present disclosure is directed to a system and method for enabling social interactive wireless communication between at least two mobile devices, for instance, upon disposition of the wireless devices in a physical and/or geographic proximity to one another.

2. Description of the Related Art

As the sophistication of mobile technology continues to increase, more individuals are using mobile devices to accomplish everyday tasks, including, but certainly not limited to, e-mail, web browsing, text messaging, and/or task management. Of course, many of these mobile devices may also serve as wireless and/or cellular telephones. In addition, many mobile devices include locational software and/or mechanisms, such as global positioning systems ("GPS") to estimate and/or locate the particular device's location.

In addition, social networking via the World Wide Web, such as via social networking websites including MYSPACE®, FACEBOOK®, TWITTER, LINKEDIN®, and/or dating websites including EHARMONY® or MATCH.COM®, continues to evolve and affect many individuals and entities of today's society. While many individuals are associated with a variety of "contacts" and/or "friends" within these social networking and/or dating websites, it would be beneficial to be advised when the individual is in a physical and/or geographic proximity to one or more "friends" or "contacts" and be able to communicate therewith via their respective mobile devices. It would also be beneficial to locate certain prospective dating and/or social matches who are disposed in a physically proximate location. This would facilitate communication therebetween and perhaps establish a long-time relationship Accordingly, there is a current need in the art of mobile technology for a system and/or method of synchronizing or affiliating one or more mobile devices with an interactive social network and enabling social interactive wireless communication therebetween, for example, upon disposition of the mobile devices in a physical and/or geographic proximity to one another.

BRIEF DESCRIPTION OF THE SEVERAL VIEWS OF THE DRAWINGS

For a more complete understanding of the nature of the present disclosure, reference should be had to the following detailed description taken in connection with the accompanying drawings in which.

Like reference numerals refer to like parts throughout the several views of the drawings.

DETAILED DESCRIPTION

Figure 1:
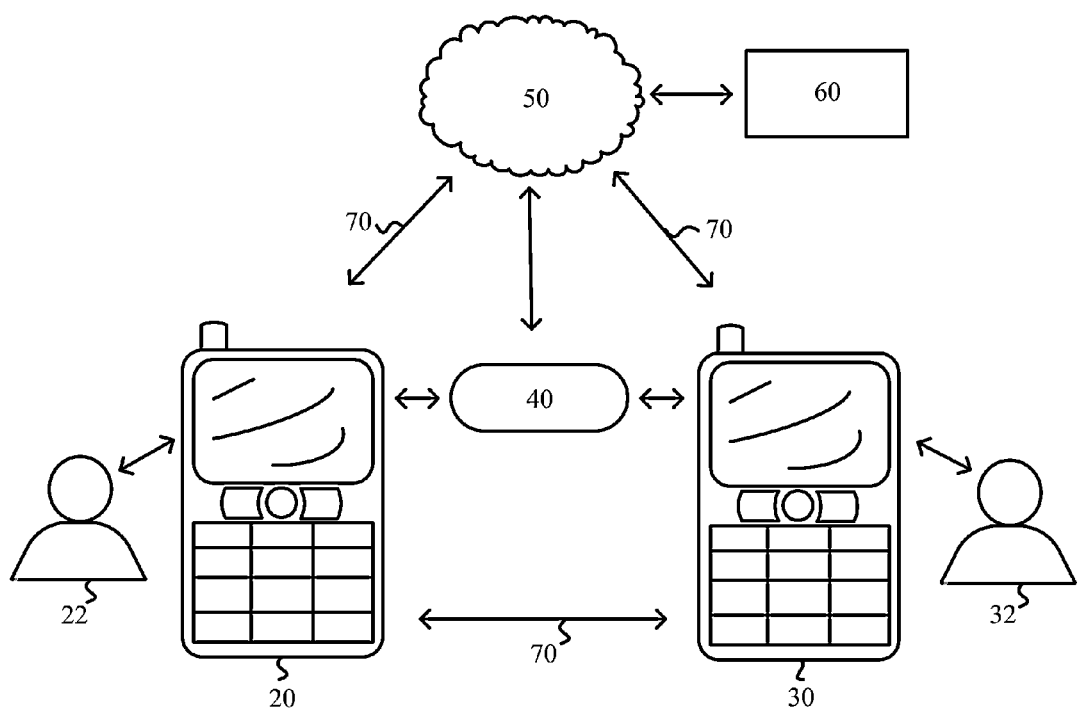
FIG. 1 is a schematic representation of at least one embodiment of the system for enabling social interactive wireless communication as disclosed in accordance with the present disclosure.

The present disclosure is directed to a system, generally indicated as 10, and method, generally indicated as 100, for enabling or facilitating interactive wireless communication between at least two mobile devices 20, 30 and/or the respective users 22, 32 thereof. In particular, the various embodiments of the present disclosure comprise at least one first mobile device 20 and at least one second mobile device 30 disposable in a physical and/or geographic proximity relative to one another.

The first and second mobile devices 20, 30 of the various embodiments of the present disclosure may comprise virtually any device or structure which is movable, portable, and/or can otherwise be easily carried or transported by a user 22, 32 thereof and which is further structured to facilitate the practice of the present disclosure in the intended manner, as described in detail herein. As such, the first and second mobile devices 20, 30 may include, but are certainly not limited to, a cellular telephone, personal digital assistant ("PDA"), portable video game console, portable media player, pager, digital and/or wireless camera, etc.

Moreover, in at least one embodiment of the present disclosure, the first and second mobile devices 20, 30 are structured to synchronize with, or otherwise be affiliated with, an interactive network 40, as generally illustrated at 102. As will become apparent from the following discussion, the interactive network 40 of the various embodiments of the present disclosure may include, for example, an interactive social network, social networking website(s), dating service(s), dating website(s), affinity groups, etc., such as, MYSPACE®, FACEBOOK®, TWITTER, EHARMONY®, a college fraternity, a group of friends, the United States Army, or any other network comprising a plurality of users and/or members associated or registered therewith. Particularly, in at least one embodiment, synchronizing and/or affiliating the first and second mobile devices 20, 30 with the interactive network 40 comprises a user 22, 32 of the respective mobile device 20, 30 to opt into the interactive network 40, by, for instance, registering, downloading, installing, and/or linking with the interactive network 40. Upon doing so, as will be explained in greater detail below, in at least one embodiment, a first interactive or social interactive pairing criterion 25 is associated with the first mobile device 20, as generally indicated at 104, and a second interactive or social interactive pairing criterion 35 is associated with the second mobile device 30, as generally indicated at 106. More in particular, and as will become apparent from the discussion herein, the first and second interactive pairing criteria 25, 35 are structured and disposed to at least partially define a match or other communicative or pairing relationship between the respective first and second mobile devices 20, 30.

Further, at least one embodiment of the present disclosure comprises at least one social network server 60 which is structured to store, manage, or control the interactive network 40 of the present disclosure. A user 22, 32 of the first and/or second mobile devices 20, 30 of at least one embodiment may thus register or develop a profile 42 with the interactive network 40 by communicating certain profile information to the social interactive server 60. The profile information may include, for example, the user's name, age, sex, occupation, salary or income, education, one or more selected affinity groups, as well as one or more physical features, including height, weight, eye color, hair color, etc. Of course, the profile information may include digital media such as photographs, videos, audio files, etc.

In addition, the user 22, 32 of one or more mobile devices 20, 30 may also or instead upload or communicate to the social interactive server 60 certain information pertaining to a desired or prospective social match, such as, for instance, certain physical features or other similar profile information which the user 22, 32 desires a social match to comprise, including age, sex, occupation, income level, location, etc. In at least one embodiment, the first and second social interactive pairing criteria 25, 35 associated with the first and second mobile devices 20, 30 identified above are defined to include the prospective match information and/or, the profile information, which may be stored on the social interactive server 60 and/or the corresponding user's 22, 32 mobile device 20, 30.

In at least one embodiment wherein the first and/or second social interactive pairing criteria 25, 35, such as for instance the profile information and/or prospective match information identified above, is stored or contained on the social interactive server 60, as will be described below, the first and second mobile devices 20, 30 may communicate with one another via the server 60, at least for purposes of developing a match and/or establishing a communication channel 70 therebetween. For example, the server 60 may automatically, and/or upon selective confirmation by the users 22, 32, detect the location of the respective mobile devices 20, 30, and determine whether there is a match. The server 60 may send notifications, confirmations, etc. to the respective devices 20, 30, for example, via text message, e-mail, pop-up, voice call, etc., in connection with the same.

In at least one embodiment wherein the first and/or second social interactive pairing criteria 25, 35 is stored or contained on the corresponding first and/or second mobile devices 20, 30, however, the mobile devices 20, 30 may communicate directly with one another, such as via a peer-to-peer, Bluetooth network, cellular, satellite, infrared, or other wireless network, for example, and completely bypass use of or a need for the social interactive server 60. This feature may be important and/or convenient when or if the mobile devices 20, 30 are not able to connect with a server 60, and/or are otherwise out of range of the server 60, satellite, cellular tower, or other communication or connection structure. As such, the first and/or second mobile devices 20, 30 of at least one embodiment are equipped or configured to detect the presence of proximately disposed other mobile devices 20, 30, and determine whether there is a match therebetween. Of course at least some or all of the social interactive pairing criteria 25, 35 may be disposed or stored on the devices 20, 30 themselves while communication therebetween is processed and/or developed thorough the server 60.

In particular, in at least one embodiment, the mobile devices 20, 30 include software or executable applications which are structured to facilitate the practice of the present disclosure in the intended manner without the need or use of a social interactive server 60. Specifically, the user 22, 32 of the mobile device(s) 20, 30 may enter certain profile information and/or prospective match information directly into the device 20, 30 itself, such as via typing, voice command, transfer from a computer, etc. Accordingly, the mobile devices 20, 30 comprise corresponding software and/or hardware structured to facilitate practice of the present disclosure independent of and without the need for a social interactive server 60.

Furthermore, upon disposition of the first and second mobile devices 20, 30 in a physical and/or geographic proximity to one another, the present system includes determining whether there is a match therebetween, or otherwise determining whether the first and second social interactive pairing criteria 25, 35 coincide with one another, as generally indicated at 108. Particularly, in at least one embodiment, the first and/or second social interactive pairing criteria 25, 35 may include, and a user 22, 32 of the mobile device(s) 20, 30 may specify or indicate, a maximum, minimum, or preferred distance or range in which to communicate with another mobile device 20, 30. For instance, the user 22, 32 may indicate on the device 20, 30 itself, on the social interactive server 60, during registration with the interactive social network 40, etc., a preferred distance from another device 20, 30 in which to communicate with, for instance, five (5) feet or one (1) mile. Of course, the distance may be preset by the software, application, and/or server 60 and thus, in at least one embodiment, unable to be modified by a user 22, 32.

Specifically, in at least one embodiment, the mobile devices 20, 30 are equipped with certain locational mechanisms and/or software, such as global positioning system(s) ("GPS") in order for the mobile devices 20, 30 and/or the server 60 to detect or estimate the mobile devices' 20, 30 location. Of course, the server 60 and/or other structure may use certain algorithms or triangulation calculations in order to determine or estimate the location of the one or more mobile device(s) 20, of the present system.

Either way, as indicated above, once the devices 20, 30 are disposed in a physical and/or geographic proximity to one another, for instance, in the same room, party, wedding, meeting, etc., the present system includes determining whether the first and second social interactive pairing criteria 25, 35 coincide with one another, as at 108. In particular, the mobile devices 20, 30 may, in at least one embodiment, be configured by the corresponding user 22, 32 to be disposed in a communicating mode so as to either detect or be detected by other mobile devices 20, 30. In such an instance, the particular mobile device 20, 30 may be attempting to search and/or filter for other proximately disposed devices 20, 30, and/or be configured as being available or in a broadcasting mode in order to be detected by other devices 20, 30. Particularly, in at least one embodiment, the user 22, 32 of a mobile device 20, 30 may notify the social interactive server 60 via the device 20, 30 that he/she desires to place the mobile device 20, 30 in the communicative mode. The server 60 and/or the software disposed thereon may thus be configured to locate the mobile device(s) 20, 30 and search for other mobile device(s) 20, 30 disposed in a proximate location thereto. In at least one embodiment, however, and as mentioned above, the mobile devices 20, 30 are equipped with hardware and/or software or otherwise configured to detect or be detected by other mobile devices 20, 30 independent of any server 60. As such, the mobile devices 20, 30 may utilize wireless communications, Bluetooth, infrared, cellular technology or other mechanisms to communicate, detect, and/or be detected.

It should be apparent that at least one mobile device 20, of the present system, may be structured and configured to be disposed in a communicative relation with one or a plurality of second mobile devices 30 in the manner as described in detail herein. In particular, the first mobile device 20 of at least one embodiment may be structured and configured to simultaneously, selectively, or successively communicate with one or more second mobile devices 30 disposed in a proximate relation thereto. In addition, the first mobile device 20 may be configured or programmed to be disposed in a communicative relation with a certain predetermined or selected maximum number of second mobile devices 30.

Furthermore, in at least one embodiment, the first social interactive pairing criterion 25 comprises a selective characteristic of an individual or user associated with a prospective wireless match. The selective characteristic(s) may include, for example, physical, locational, emotional, or personality type characteristics. In addition, the second social interactive pairing criterion 35 associated with the second mobile device 30 may comprise a pre-established or predefined profile associated with the user 32 thereof. Specifically, the profile may be stored on the second mobile device 30 itself and/or one or more social interactive servers 60, as described above.

In particular, and for exemplary purposes only, the first social interactive pairing criterion 25 associated with the first mobile device 20 may essentially represent that the user 22 thereof is searching for a 25 to 30 year old female individual, between 5'4" and 5'8", blonde or brown hair, living in South Florida. If the second social interactive pairing criterion 35 associated with the second mobile device 30 includes a pre-established or pre-defined profile which coincides therewith, or represents, for example, a 28 year old, 5'6", blonde female, living in Miami, Fla., at least one embodiment of the present disclosure would determine that the first and second social interactive pairing criteria 25, 35 coincide with one another, assuming that each of the respective devices 20, 30 are configured to be in the communicative mode, as described above. Of course, the various embodiments of the present disclosure include certain predefined software algorithms which are structured to determine a match. The algorithms of the various embodiments may weigh certain attributes or profile information more heavily than others and/or only compare certain pre-specified attributes.

Furthermore, in at least one embodiment, upon disposition of the first and second mobile devices 20, 30 in the physical or geographic proximity with one another, and/or upon determining a match therebetween, the second social interactive pairing criterion 35, such as, for example, the profile associated with the user 32, is communicated to the first mobile device 20. Upon its receipt, the user 22 of the first mobile device 20 may selectively confirm or deny whether to establish a communication channel therewith. Similarly, in at least one embodiment, the first social interactive pairing criterion 25, such as the prospective match information, and/or a profile associated with the user 22 of the first mobile device 20 may be communicated to the second mobile device 30. Upon its receipt, the user 32 of the second mobile device 30 may selectively confirm or deny whether to establish a communication channel therebetween. It should be noted that, in at least one embodiment, the entire profile associated with the first and/or second mobile device 20, 30 may be communicated to the other device 20, 30 for review thereof. However, certain information may be withheld upon the corresponding user's 22, 32 request.

Figure 5:
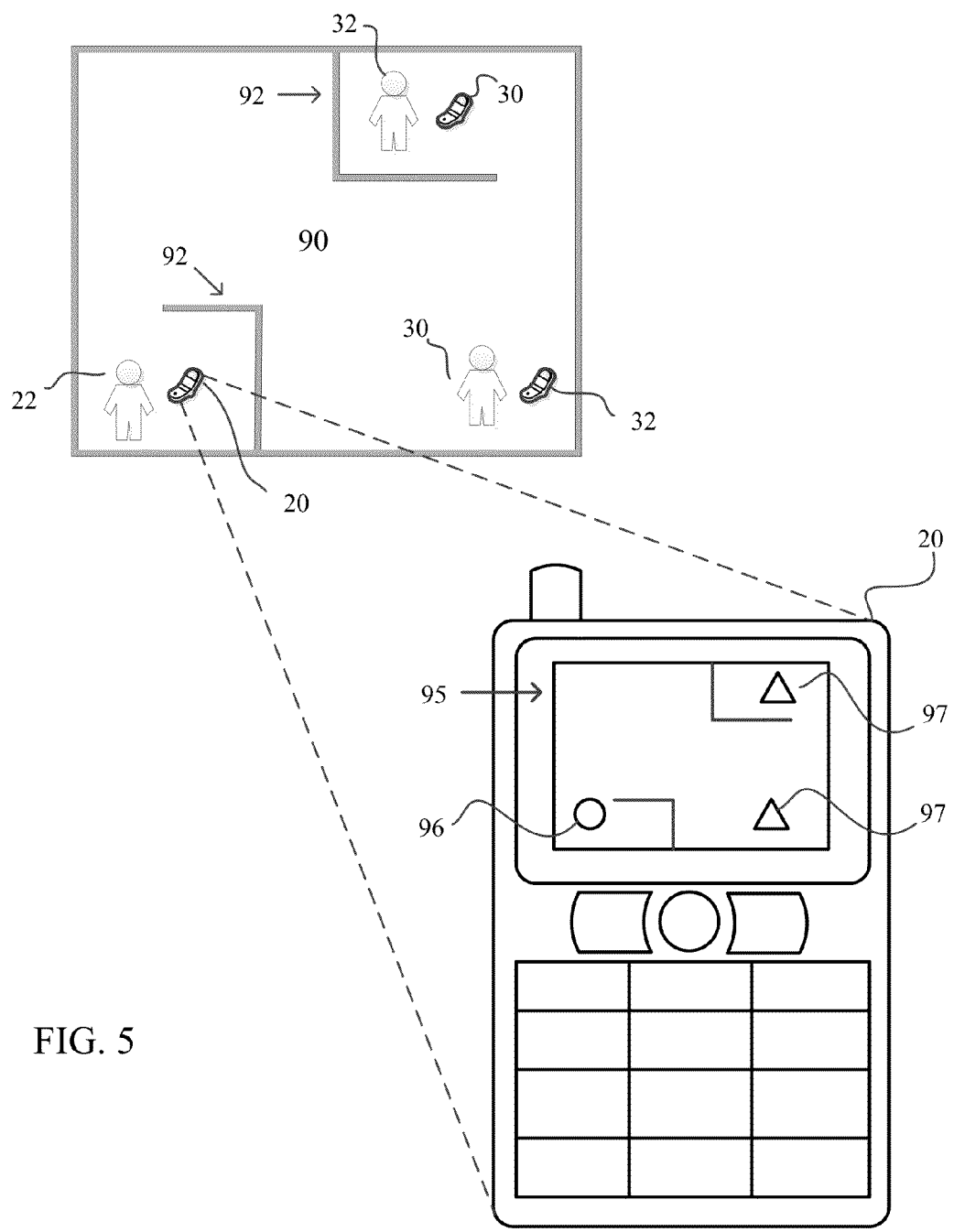
FIG. 5 is a schematic representation of another embodiment of the system and method for enabling interactive wireless communication disclosed in accordance with the present disclosure.

Furthermore, in at least one embodiment, the present system is structured to graphically display a map illustrating the user's 22 location as well as the location of any one or more prospective matches disposed in a proximate location. In particular, the method of the present system may, in at least one embodiment, comprise graphically displaying on the first mobile device 20 the location of one or a plurality of proximately disposed second mobile devices 30. Of course, the second mobile device(s) 30 may also graphically display the location of the first mobile device(s) 20. For exemplary purposes only, and referring now to the schematic representation illustrated in FIG. 5, while in a large room 90 or trade show, at least one embodiment is structured to graphically display a map 95 of the room 90 and/or trade show while indicating the location of the user 22, 32 and/or one or more potential matches thereon via for instance, an icon 96, 97, respectively. Of course any indication or indicia may be used to represent the location of the users 22, 32, and/or the respective mobile devices 20, 30. The walls, tables, chairs, doors, desks, booths, or other structures or devices 92 within the room 90 may also be graphically displayed on the map 95, as illustrated in the expanded view of the first mobile device 20 of FIG. 5.

In addition, an introduction communication channel may be established wherein the users 22, 32 may electronically communicate with one another via limited means, such as, for instance, only e-mail, text message, or live chat. The user's 22, 32 may later decide to establish a full communication channel where digital media can also be communicated.

Furthermore, once a match has been determined, or otherwise once it has been determined that the first and second social interactive pairing criteria 25, 35 coincide with one another, at least one embodiment of the present system is structured to automatically or upon the user's 22, 32 selective confirmation, establish a communication channel 70 between the first and second mobile devices 20, 30 so as to facilitate communication therebetween, as generally indicated at 110. As such, the user 22 at the first mobile device 20 may communicate with the user 32 at the second mobile device 30 via voice messages, live chatting, text messages, photographs, videos, contact information, electronic mail, and/or any other digital media or communication techniques, and vice-versa.

Referring to 112, the first and second mobile devices 20, 30 may be configured to automatically, or upon the user's selective confirmation, communicate and/or push certain selective digital media, such as photographs, messages, videos, etc. upon the establishment of the communication channel therebetween. The digital media may comprise, but is certainly not limited to MP3, AAC, WMV, MPEG4, QUICKTIME, JPG, BMP, MPEF, AVI, MICROSOFT WORD®, MICROSOFT EXCEL®, ADOBE ACROBAT®, PDF, or VCF files. In particular, the pushing of the digital media allows users 22, 32 to communicate with one another via the mobile devices 20, 30 without any human voice one-to-one communication. As such, in at least one embodiment, the mobile devices 20, 30 of at least one embodiment may be at least partially autonomous in connection with establishing a match, and communicating certain media and/or messages.

For example, upon the communication channel being opened, the user 22 of the first mobile device 20 may be presented with an option to download one or more digital media files associated with the user 32 of the second mobile device 30. This option may be in the form of a graphical user interface displayed on the first mobile device 20 that includes a list of one or more digital media files associated with the second mobile device 30. By way of example, the list can include one or more of a video (e.g., an introductory video), an image (e.g., an image of the second user), audio (e.g., an audio introduction), and/or a text file (e.g., a resume). These digital media files may be stored within the second mobile device 30 and/or an external storage, such as within the social interactive server 60. As such, the digital media may be downloaded by the first mobile device 20 either directly from the second mobile device 30 or the external storage.

Additionally, depending upon a type of match between the user 22 of the first mobile device 20 and the user 32 of the second mobile device 30, different digital media files may be presented. The type of match may be selected from a plurality of possible types. Although not limited in this manner, the selection of the type of match may be based upon the particular characteristics within the respective interactive pairing criteria 25, 35 that are matched.

For example, the type of match may implicate a business relationship match, the digital media presented from one user to the other user may be tailored to a business relationship match. For example, the introductory video/audio introduction may be more formal and discuss the type of services provided by a company associated with the particular user. A file with the user's company brochure may also be provided.

Alternatively, if the type of match implicates a personal relationship match, the digital media files selected to be presented may be tailored to a personal relationship match. For example, the introduction may be less formal and the type of information provided (e.g., the user's profile) may include certain information (e.g., age, height, weight) that are more appropriate for a personal relationship. By way of another example, if the type of relationship implicates an alternative relationship match (e.g., finding somebody with whom to golf), the digital media files selected to be presented to the other user may include pictures of the user's golf clubs or favorite golf course as well as a digital media file that describes the user's golf handicap. The examples presented above represent only a few of the many types of relationships that can be used to dictate the particular digital media files selected to be presented to a requesting user.

In yet another embodiment, upon disposition of the first and second mobile devices 20, 30 in a physical and/or geographic proximity to one another, the present system is structured to query the second mobile device 30 so as to determine whether the first and second interactive pairing criteria 25, 35 coincide with one another. The queries may, in at least one embodiment, occur automatically upon disposition of the mobile devices 20, 30 in a physical proximity to one another and/or upon interactive or selective input from the respective users 22, 32 thereof. In addition, as will be described below, at least one embodiment may comprise a series of successive queries to the first and/or second mobile devices 20, 30.

In particular, as identified above, the first social interactive pairing criterion 25 and/or the prospective match information of the present system may comprise a plurality of selective characteristics, such as female, blonde hair, blue eyes, 5'5", living in Miami, Fla. Further, the prospective match information may be compound and may include the following, for example: a female with blonde or brown hair, and living in Miami, Fla.; if blonde hair, then blue eyes, but if brown hair, then brown eyes.

As identified above, in at least one embodiment, the present system is structured to query the second mobile device 30 to determine if the first and second social interactive pairing criteria 25, 35 coincide with one another, or otherwise determine if the selective characteristics associated with the first mobile device 20 coincide with the profile of the second mobile device 30. Accordingly, upon disposition of the devices 20, 30 in a proximate relation with one another, the first device 20 and/or the server 60 of at least one embodiment is structured to query the second mobile device 30, wherein the user 32 may selectively respond. However, it is contemplated that, in at least one embodiment, the second mobile device 30 may automatically respond with or without the user's 32 knowledge based upon, for example, the user's 32 pre-established profile.

For instance, the second mobile device 30 may be asked male or female? Using the example identified above, if the second mobile device 30 responds with "male", the query session ends as there is no match. However, if the second mobile device 30 responds with "female," at least one embodiment of the present system is structured to provide a series of successive queries, and may thus ask a follow-up question, such as, what is your hair color? Again using the example above, if the response is "red" the query session ends. However, "blonde" or "brown" will continue the series of successive queries.

In yet another embodiment of the present disclosure, the interactive social network 40 comprises one or more social networking websites 80 accessible via an interactive computer network 50. Specifically, in at least one embodiment, the interactive computer network 50, as used herein, may generally refer to a collection of computer networks commonly known as the World Wide Web. Specifically, the World Wide Web represents a collection of computer networks cooperatively connected to each other and accessed by virtue of the Internet Protocol or other like protocols. It is contemplated, however, that the interactive computer network 50 may include virtually any computer network, such as, for example, a Wide Area Network ("WAN"), Local Area Network ("LAN"), Intranet, peer-to-peer network ("P2P"), Blue Tooth network, mobile network, etc.

In addition, the one or more social networking websites 80 may comprise, for example, MYSPACE®, FACEBOOK®, TWITTER, LINKEDIN®, etc. Accordingly, synchronizing the first mobile device 20 and the second mobile device 30 with an interactive social network 40, as represented at 102, may, in at least one embodiment, comprise virtually linking the mobile devices 20, 30 with a social networking website 80 such as MYSPACE®, FACEBOOK®, TWITTER, or LINKEDIN®. Specifically, in at least one embodiment, the first mobile device 20 is linked with a first profile 82 associated with the social networking website 80 and the second mobile device 30 is linked with a second profile 84 associated with the same social networking website 80. Upon doing so, in at least one embodiment, the first and second profiles 82, 84 of the social networking website 80, and/or an identification of the "contacts" or "friends" associated therewith, is downloaded or saved to the respective mobile device 20, 30 and/or the server 60. However, in at least one embodiment, the mobile devices 20, 30 and/or server 60 may be structured, configured, and authorized to access in real-time the associated social networking website profile 82, 84 so as to compare the corresponding "contacts" and/or "friends" with other mobile devices 20, 30, as explained below.

For instance, a member or profile 82, 84 of the social networking website 80 may include or otherwise be associated with one or more "contacts" and/or "friends." The "contacts" and/or "friends" are generally other members of the same social networking website 80. Moreover, in at least one embodiment of the present disclosure, the user 22 of the first mobile device 20 is associated with the first profile 82 of the social networking website 80, and thus the "contacts" or "friends" thereof are those of the user 22. Similarly, the user 32 of second device 30 is associated with the second profile 84 of the social networking website 80, and thus the "contacts" or "friends" thereof are those of the user 32. As such, in at least one embodiment of the present disclosure, the first social interactive pairing criterion 25 comprises an identification of at least one social contact or friend associated with the first profile 82 of the social networking website 80. Similarly, the second social interactive pairing criterion 35 of at least one embodiment comprises an identification of at least one social contact associated with the second profile 84 of the social networking website 80.

Figure 4:
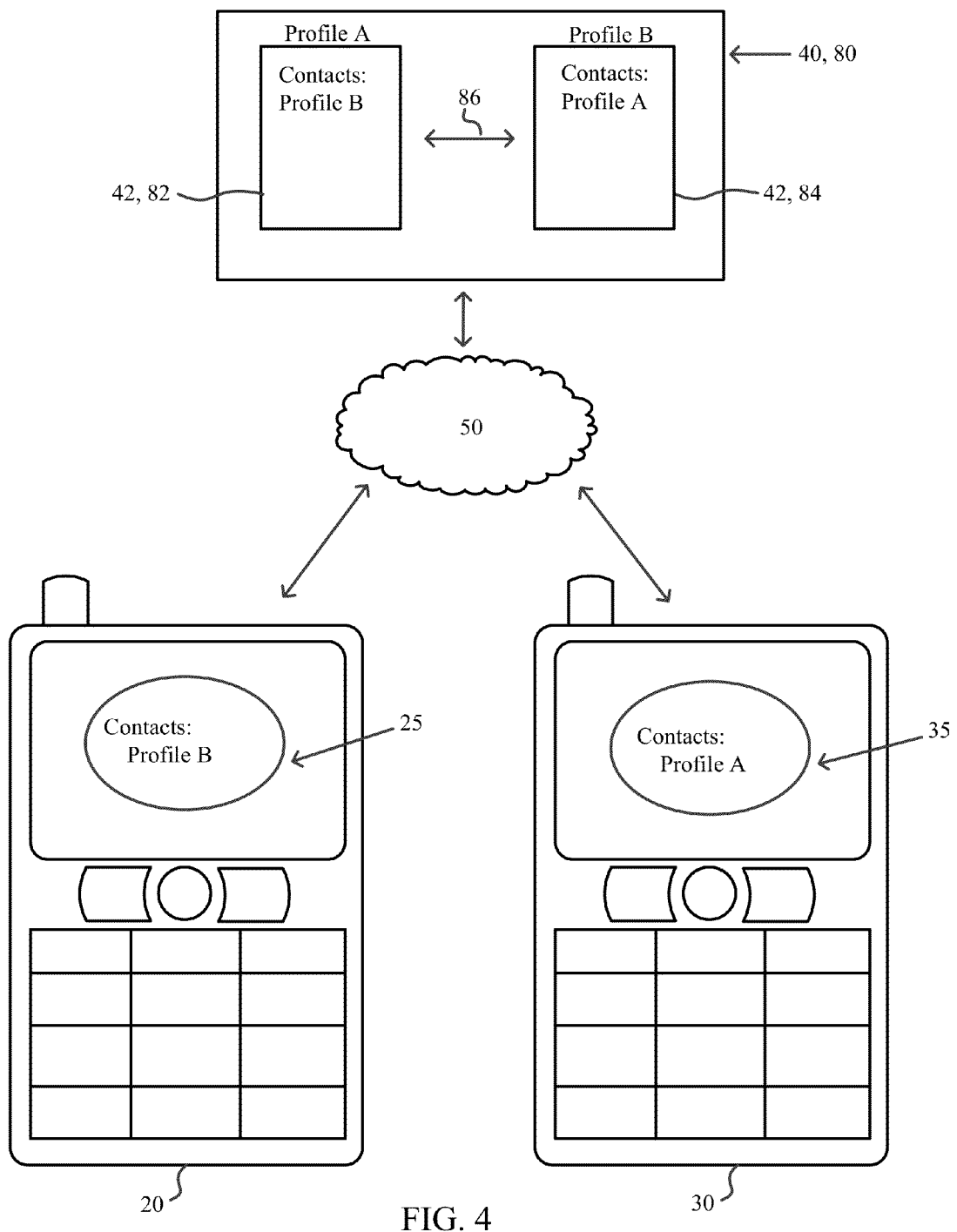
FIG. 4 is a schematic representation of yet another embodiment of the system for enabling social interactive wireless communication as disclosed in accordance with the present disclosure.

Thus, in such an embodiment, if the first profile 82 and the second profile 84 are in fact virtually connected with one another via the social networking website 80, upon disposition of the first and second mobile devices 20, 30 in a physical and/or geographic proximity to one another, at least one embodiment of the present system is structured to dispose the mobile devices 20, 30 in a communicative relation with one another, or otherwise notify the users 22, 32 thereof of each other's presence. In particular, the first and second profiles 82, 84 are said to be virtually connected with one another if the first and second profiles 82, 84 are "contacts" or "friends" with one another within the social networking website, as schematically illustrated as 86 in FIG. 4.

Furthermore, as presented below, the following are mere illustrative examples of the present disclosure in accordance with the detailed description of the various embodiments disclosed herein. For instance, a user 22 may walk into a meeting room and instruct his/her mobile device 20 to search for other users 32 who are on a pre-established "friend" or "contact" list associated with a particular social networking website, such as MYSPACE®. The user's 22 mobile device 20 may receive communications from a social networking server 60 that another individual who is identified on the "friend" or "contact" list is in a geographic proximity to the user 22, for instance, within the same meeting room. Both users 22, 32 are advised of each other's presence via communication from the server 60 and may selectively choose to communicate with one another in virtually any manner, such as, walking over to each other, instant messaging, telephone, or e-mail.

In yet another illustrative example of the present disclosure, a user 22 is at a party and desires to selectively advise other individuals that he or she is there. The user 22 may push or communicate to the server 60 via the first mobile device 20 that he/she is at the party and also indicate certain prospective match information directly on the mobile device 20 in real-time. The user 22 may update or modify the prospective match information or any profile information at any time via the mobile device 20, itself, and without the need to access a separate computer or server 60.

In a further illustrative example, a user 22 is at a trade show and desired to transmit his electronic business card, for instance in a .vcf format, or other digital media or data to other individuals who are interested in receiving it. The user 22 may then instruct the mobile device 20 to push his or her location to the server 60, and the server 60 may thereafter search for other users or mobile devices 30 disposed in a geographic proximity who are interested in receiving the user's 22 electronic business card. If so, the server 60 may send the information to such individuals or mobile devices 30.

As another illustrative example, a user 22 is at a function and desires to meet another individual who is a member of the same affinity group. The affinity group may include, for example, a military group, the U.S. Air Force, a school, an online community, a common interest group, a member of a particular company, charity, or sports group, etc. The user 22 may instruct his mobile device 20 to push his geographic location and an identification of his affinity group to the server 60. The server 60 is then structured to locate any other individuals in a geographic proximity who are members of the same or similar affinity group.

Figure 6:
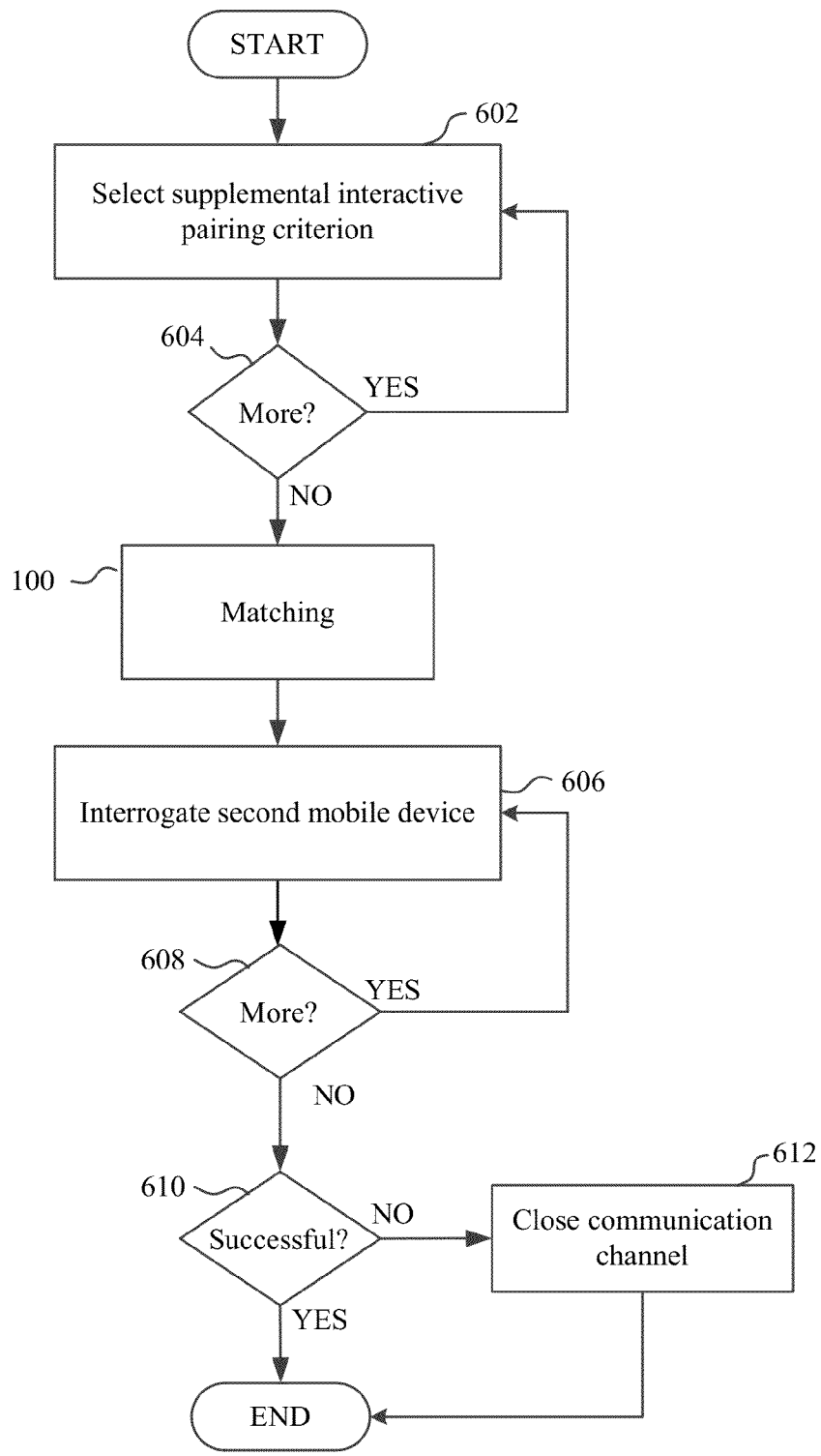
FIG. 6 is a flow chart of an alternative embodiment of the present disclosure.

Reference is made to FIG. 6, which illustrates a flow chart of an alternative embodiment of the present disclosure. There may be instances in which the profiles 42 of the respective first and second users 22, 32 do not contain all the characteristics by which a complete match may be identified. For example, in the context of a match attempted to be made between a user looking for an attorney and an attorney, the user may be looking for a characteristic that is not included in the attorney's profile. In this example, the user may be looking for an attorney that works in New York City and has a specialty in trusts and estate law. Although these characteristics may be contained within the attorney's profile, the user is also looking for an attorney that has Saturday hours and an office somewhere in Florida. For sake of this example, assume that these supplemental characteristics are not found within the attorney's profile. As such, when the user puts together the first interactive pairing criterion 25, the characteristics of Saturday hours and an office in Florida may not be available as choices.

Referring to 602, the first user 22 has the opportunity to create a supplemental interactive pairing criterion, which can include characteristics not normally found within the profiles 42 of the users 22, 32. The first user 22 is not limited in the manner by which the supplemental interactive pairing criterion is selected. For example, the first user 22 may contemporaneously generate supplemental interactive pairing criterion. In addition to or alternatively, the first user 22 may select from a previously generated supplemental interactive pairing criterion. In 604, the first user 22 may choose to add additional supplemental interactive pairing criterion.

Figure 2:
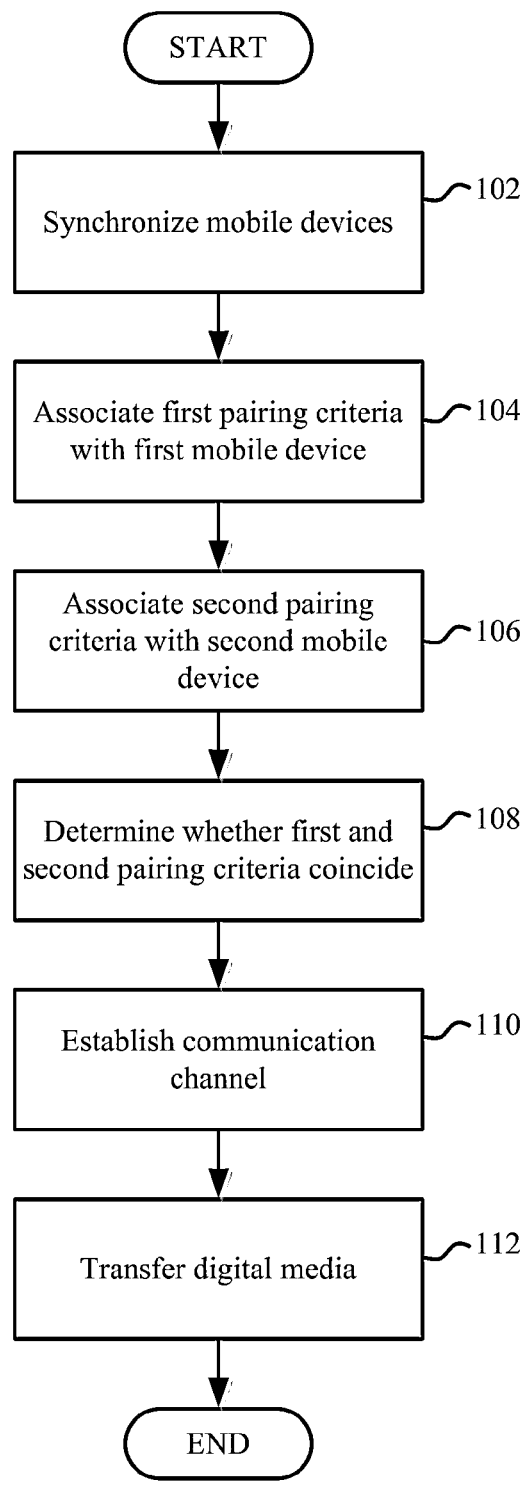
FIG. 2 is a flow chart illustrating at least one embodiment of the method for enabling social interactive wireless communication as disclosed in accordance with the present disclosure.
Figure 3:
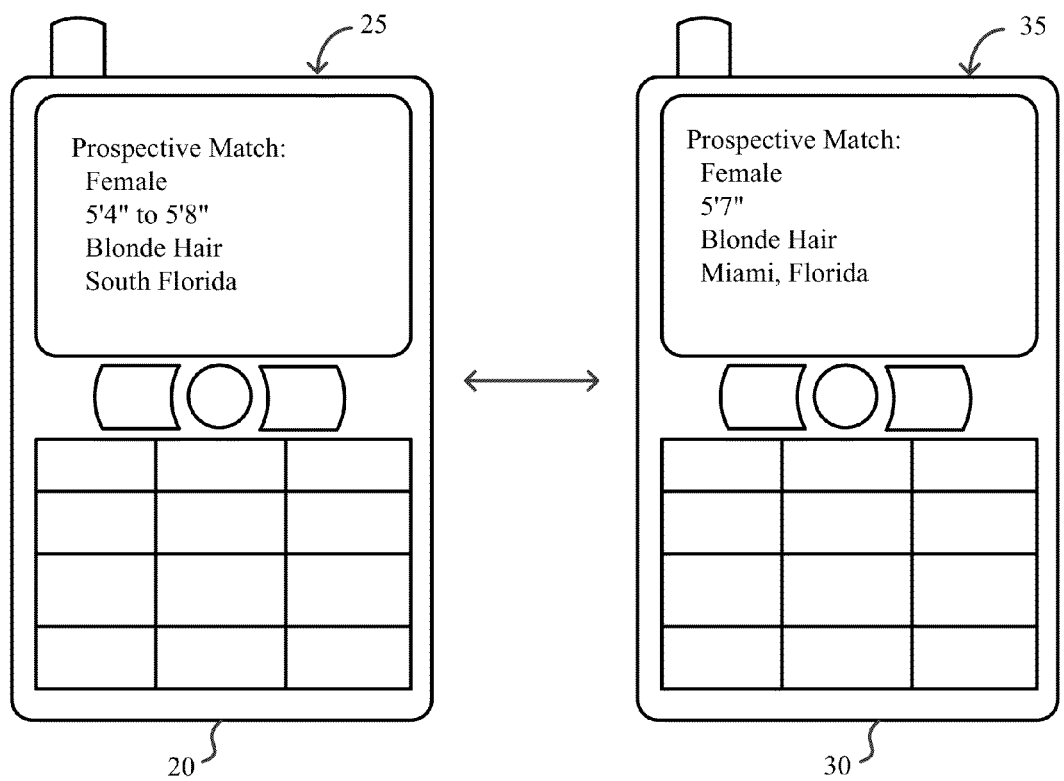
FIG. 3 is a schematic representation of a first and second mobile device comprising coinciding first and second social interactive pairing criterion.

Referring to 100, the process of FIG. 2 is performed and a communication channel is established between the first mobile device 20 and the second mobile device 30. In 606, after the communication channel has been established, the first mobile device 20 can interrogate the second mobile device 30 using the supplemental interactive pairing criterion to determine if a match exists. In certain aspects, the second mobile device 30 automatically uses supplemental information about the second user 32, separate from the profile 42 of the second user 32, in responding to the interrogation from the first mobile device 20. Alternatively, the second mobile device 30 may prompt the second user 32 to enter in supplemental information, separate from the profile 42 of the second user 32, that can be used to respond to the interrogation from the second mobile device 20. In 608, the interrogation can continue with additional supplemental interactive pairing criterion. Alternatively, 606 may be performed prior to the communication channel be established between the first mobile device 20 and the second mobile device 30.

In 610, depending upon the results of the interrogation of the second mobile device 30 by the first mobile device 20, the communication channel may remain open based upon a full or partial match using the supplemental interactive pairing criterion. If the communication channel has not yet been opened, a communication channel can be opened as described with reference to 110 in FIG. 2. Alternatively, in 612, the communication channel may be closed based upon an unsuccessful interrogation in which a full or partial match does not exist using the supplemental interactive pairing criterion.

What is claimed is:

1. A first mobile device having a first interactive pairing criterion associated therewith, comprising:
    a display; and
    a processor, wherein the processor is configured to perform and/or initiate:
        issuing, upon a second mobile device, associated with a second user, having a second interactive pairing criterion being geographically positioned within a predetermined geographic distance from the first mobile device, associated with a first user, an automatic query to determine whether the first interactive pairing criterion and the second interactive pairing criterion at least partially coincide with one another; and
        downloading, upon a determination that the first interactive pairing criterion and the second interactive pairing criterion at least partially coincide with one another, a digital media file associated with the second mobile device, wherein both the first user and the second user are associated with a same social networking website.

2. The first mobile device of claim 1, wherein displaying a list of one or more digital media files associated with the second mobile device.

3. The first mobile device of claim 2, wherein the one or more digital media files displayed on the list are selected based upon a type of relationship implicated by the first interactive pairing criterion and the second interactive pairing criterion at least partially coinciding with one another.

4. The first mobile device of claim 3, wherein the type of relationship is selected from a plurality of possible relationships.

5. The first mobile device of claim 1, wherein the digital media file is automatically downloaded.

6. The first mobile device of claim 1, wherein the digital media file is downloaded directly from the second mobile device.

7. The first mobile device of claim 1, wherein the digital media file is downloaded from external storage separate from the second mobile device.

8. The first mobile device of claim 1, wherein the digital media file includes one of a VCF file, a MP3 file, a WMV file, a MPEG4 file, a QUICKTIME file, a JPG file, a BMP file, and a PDF file.

9. A system comprising:
    a first mobile device, associated with a first user, having a first interactive pairing criterion associated therewith; and
    a second mobile device, associated with a second user having a second interactive pairing criterion associated therewith, wherein the first mobile device includes a processor configured to perform and/or initiate:
        issuing, upon the second mobile device being geographically positioned within a predetermined geographic distance from the first mobile device, an automatic query to determine whether the first interactive pairing criterion and the second interactive pairing criterion at least partially coincide with one another; and
        downloading, upon a determination that the first interactive pairing criterion and the second interactive pairing criterion at least partially coincide with one another, a digital media file associated with the second mobile device wherein both the first user and the second user are associated with a same social networking website.

10. The system of claim 9, wherein displaying a list of one or more digital media files associated with the second mobile device.

11. The system of claim 10, wherein the one or more digital media files displayed on the list are selected based upon a type of relationship implicated by the first interactive pairing criterion and the second interactive pairing criterion at least partially coinciding with one another.

12. The system of claim 11, wherein the type of relationship is selected from a plurality of possible relationships.

13. The system of claim 9, wherein the digital media file is automatically downloaded.

14. The system of claim 9, wherein the digital media file is downloaded directly from the second mobile device.

15. The system of claim 9, wherein the digital media file is downloaded from external storage separate from the second mobile device.

16. The system of claim 9, wherein the digital media file includes one of a VCF file, a MP3 file, a WMV file, a MPEG4 file, a QUICKTIME file, a JPG file, a BMP file, and a PDF file.

17. A method, executed by a first mobile device having a first interactive pairing criterion associated therewith, comprising:
    issuing, upon a second mobile device, associated with a second user, having a second interactive pairing criterion being geographically positioned within a predetermined geographic distance from the first mobile device, associated with a first user, an automatic query to determine whether the first interactive pairing criterion and the second interactive pairing criterion at least partially coincide with one another; and
    downloading, upon a determination that the first interactive pairing criterion and the second interactive pairing criterion at least partially coincide with one another, a digital media file associated with the second mobile device, wherein both the first user and the second user are associated with a same social networking website.

18. The method of claim 17, further comprising displaying a list of one or more digital media files associated with the second mobile device.

19. The method of claim 18, wherein the one or more digital media files displayed on the list are selected based upon a type of relationship implicated by the first interactive pairing criterion and the second interactive pairing criterion at least partially coinciding with one another.

20. The method of claim 19, wherein the type of relationship is selected from a plurality of possible relationships.

21. The method of claim 17, wherein the digital media file is automatically downloaded.

22. The method of claim 17, wherein the digital media file is downloaded directly from the second mobile device.

23. The method of claim 17, wherein the digital media file is downloaded from external storage separate from the second mobile device.

24. The method of claim 17, wherein the digital media file includes one of a VCF file, a MP3 file, a WMV file, a MPEG4 file, a QUICKTIME file, a JPG file, a BMP file, and a PDF file.

25. The method of claim 17, wherein both the first interactive pairing criterion and the second interactive pairing criteria are associated with the social networking website.

26. The method of claim 25, wherein the determination is performed by the social network website.

* * * * *